Dec. 29, 1970  R. W. GUNDLACH  3,551,146
INDUCTION IMAGING SYSTEM

Filed Oct. 16, 1969  4 Sheets-Sheet 1

INVENTOR.
ROBERT W. GUNDLACH

BY David C. Petre

ATTORNEY

United States Patent Office 3,551,146
Patented Dec. 29, 1970

3,551,146
INDUCTION IMAGING SYSTEM
Robert W. Gundlach, Victor, N.Y., assignor to Xerox Corporation, Rochester, N.Y., a corporation of New York
Continuation-in-part of applications Ser. No. 467,445, June 28, 1965, and Ser. No. 740,144, June 26, 1968. This application Oct. 16, 1969, Ser. No. 867,049
Int. Cl. C03g *13/18, 13/22, 15/18*
U.S. Cl. 96—1
32 Claims

ABSTRACT OF THE DISCLOSURE

An imaging method comprising the steps of providing a first surface having a first electrostatic latent image thereon; positioning a receiving member having a resistivity between about $10^7$ and $10^{14}$ ohm-cm. against said first surface, applying a potential to said receiving member preferably by contacting said receiving member with an electrically conductive member and stripping said receiving member from said first surface while maintaining contiguity, at least in the region where stripping is occurring, between the free surface of said receiving member and an electrically conductive member; whereby an induced electrostatic latent image, which may be the same or opposite in image sense to that of said first electrostatic latent image depending on the magnitude of said applied potential, is formed in said receiving member. The induced electrostatic latent image may be rapidly utilized preferably by developing with electroscopic marking material generally within about the relaxation time of said receiving member.

CROSS REFERENCES TO RELATED APPLICATIONS

This application is a continuation-in-part of my copending applications, Ser. No. 467,445, filed June 28, 1965, now abandoned, and Ser. No. 740,144, filed June 26, 1968 which is a continuation-in-part of 467,445.

BACKGROUND OF THE INVENTION

This invention relates to novel systems for forming and rendering visible electrostatic latent images, i.e., xerography and more particularly to systems and methods for advantageously transferring, i.e., forming or inducing an electrostatic image to be developed in a receiving sheet.

It is known that images may be formed and developed on the surface of certain photoconductive insulating materials by electrostatic means and transferred therefrom to a receiving sheet. The basic xerographic process, as taught by Carlson in U.S. Pat. 2,297,691 involves uniformly charging a photo conductive insulating layer and then exposing the layer to a light-and-shadow image pattern of activating electromagnetic radiation, for example light, which dissipates the charge on the portions of the layer which are exposed to light. The electrostatic latent image formed on the layer corresponds to the configuration of the light and shadow image. Alternatively, a latent electrostatic image may be formed on the plate by charging said plate in image configuration. This image is rendered visible by depositing on the latent imaged layer a finely divided developing material comprising a colorant called a toner, the toner brought to the latent image typically by a toner carrier. The powdered developing material will normally be attracted to those portions of the layer which retains a charge, thereby forming a powder image corresponding to the latent elastrostatic image. The powder image may be fixed in place or may be transferred to a second surface, for example, by placing a sheet of receiving material, such as paper, over the powder image and charging the back of the paper. The powder is thus attracted to the paper and may be removed therewith. The powder image may be made permanent by treatment with solvent vapor or by heat fusing. The above general process is also described in U.S. Pats. 2,357,809; 2,891,011; and 3,079,342.

The above described process is capable of producing excellent copies, and is in widespread use. This process has its greatest utility where one or a few copies of a particular original are desired. The relatively low speed of this process, and the fact the successive copies of a single original are equally expensive make this process less desirable where a large number of copies of a single original are to be made. The above process must be repeated entirely for each copy. The photoconductive insulating layer must be charged, exposed, developed, the image transferred, and the photoconductive insulating layer cleaned for each copy made. Thus, it would be desirable to simplify this process where a plurality of copies of a single original are to be made.

The photoconductive insulating layer is subject to appreciable wear in that it is typically contacted with relatively abrasive carrier beads for the toner and must be cleaned of residual toner particles after each exposure and development and/or transfer sequence. This has limited the selection of materials for reusable photoconductive insulating materials to those having a hard, tough, abrasion resistant surface. Because of this, vitreous selenium has become the commercial standard for use as a reusable xerographic plate. Selenium plates are capable of producing many thousands of copies before wearing out. Other known photoconductive insulating materials, such as organic photoconductive materials, organic and inorganic photoconductive pigments in binders, and vitreous enamel plates which have many desirable properties, e.g., panchromatic sensitivity and higher photographic sensitivity, are not now useful in a reusable plate system because their surfaces have insufficient toughness and they may develop humidity sensitivity with wear. Thus, there is a need for an imaging method which would not abrade the photoconductive insulating surface.

So called "interposition" development has been disclosed in U.S. Pat. 2,297,691. This system obviates abrasion damage to the xerographic plate since a receiving sheet, such as paper is placed in contact with the plate having an electrostatic latent image thereon, and toner is applied to the back of the receiving sheet and fixed thereon. Thus, no contact of abrasive toner or carrier beads with the xerographic plate would be required and no cleaning of residual toner from the plate would be necessary. This process, however, has been found to be very sensitive to humidity. Where relative humidity is appreciably over 10 percent, it has been found that the electrostatic field does not persist through the paper for the length of time necessary to permit effective deposition of the toner in image configuration. While attempts have been made to dry the paper receiving sheet just before use, this has a tendency to damage selenium xerographic plates since contacting the plate with heated paper tends to crystallize the selenium and reduce its resistivity. Also, the paper drying step is time-consuming and consumes excessive energy.

Another method of developing electrostatic latent images without contacting the photoconductive surface with the developing materials is disclosed, for example, in Carlson et al. Pat. No. 2,982,647. In this method, a uniformly charged sheet of insulating material is positioned against the photoconductive surface having an electrostatic image thereon. As the charged insulating sheet is stripped from the photoconductor, a "field discharge" effect occurs which results in charge transfer to the insulating sheet in conformity to the original latent electrostatic image on the photoconductive layer. The resulting image on the insulating sheet may then be developed by conventional electrophotographic means. This method, then, is effective in producing copies without contacting the photoconductive surface with developer materials. However, the field discharge substantially destroys the latent image on the photoconductive surface preventing reuse thereof. Also, the sheet of insulating material must have very low conductivity. If paper is to be used, it must be in equilibrium with a relative humidity below 10 percent. To attain and maintain this very dry condition necessitates expensive and complicated baking, desiccating and packaging procedures.

Still another process for developing latent electrostatic images without contacting the electrostatic image on the photoconductor with developer materials is disclosed in Hall Pat. 3,084,061. In this method, an electrostatic latent image is formed on a photoconductive surface. A sheet of an insulating material is positioned on the photoconductive surface. Then a uniform potential is applied to the back surface of the insulator, e.g., by corona discharge. Because of the field extending through the insulator from the original charge on the photoconductive surface, the top surface of the insulator is induction charged so that the charge applied to the top surface varies in image configuration. For example, where a positive image had been formed on the photoconductive surface and the top surface of the insulator is charged to a uniformly negative potential, the negative charge will be greater in those areas adjacent the original positive image. As the insulating layer is stripped from the photoconductive surface, air break-down occurs in charged areas resulting in a transfer of charge from the photoconductive layer to the lower surface of the insulating layer. The insulating layer may then be developed by conventional methods producing an image conforming to the original. However, the unavoidable air break-down which transfers charge to the lower surface of the insulating layer upon separation impairs the charge pattern in the photoconductive layer, limiting the capability of the original pattern to produce additional copies. Also, this process requires that the transfer sheet be highly insulating. This introduces problems in attaining and maintaining the extremely low relative humidity necessary for paper and other similar materials to be used in the process.

Carlson et al. Pat. 2,982,647 and Hall Pat. 3,084,061 are additionally distinguished over by the numerous advantages and very real differences in kind and for the reasons presented in the amendment after final filed Feb. 13, 1969 in 467,445 which amendment is expressly incorporated herein by reference.

SUMMARY OF THE INVENTION

It is, therefore, an object of this invention to provide a xerographic process and more broadly a novel imaging system overcoming the above-noted deficiencies.

It is another object of this invention to provide a method of transferring, i.e., forming an electrostatic latent image in a receiving member by inducing a second electrostatic latent image in the receiving member, said induced image typically either (a) opposite in polarity to and a mirror image (i.e., same image sense) of the master or first electrostatic image or (b) of the same polarity but opposite in image sense to the master electrostatic image.

It is a further object of this invention to provide a novel induction imaging process capable of producing good continuous tone and solid area images as well as good line copy.

It is another object of this invention to provide a method for producing a plurality of copies from a single master electrostatic latent image.

It is another object of this invention to provide a xerographic imaging process capable of producing duplicate images more rapidly than was heretofore thought possible.

Yet another object of this invention is to provide an electrophotographic imaging process wherein image development is realized at a location remote from the photoreceptor either on the ultimate print suporting member or some other surface thus eliminating the degradation of the photoconductive material as well as simplifying the process by eliminating the need for cleaning the photoreceptor following each cycle.

It is another object of this invention to provide a xerographic imaging process eliminating the need for contacting the surface of a latent imaged photoreceptor with developers and thus substantially eliminating abrasive damage to the xerographic plate.

It is another object of this invention to provide a xerographic imaging process capable of reusing xerographic plates made from most photoconductive insulating materials.

It is still another object of this invention to provide a method of inducing an electrostatic latent image in a receiving sheet that does not require direct point to point contact application of a uniform potential to the entire receiving sheet.

It is still another object of this invention to provide a method of inducing an electrostatic latent image in receiving sheets made up of relatively conductive materials, which include paper.

It is still another object of this invention to provide a method of inducing an electrostatic latent image in a receiving member and developing either on the free surface of the receiving member, that is the side away from the master image, or on the bottom side of the receiving member, or both.

The above objects and others are accomplished by basically providing an imaging method comprising the steps of providing a first surface having an electrostatic latent image thereon; positioning a receiving member having a resistivity between about $10^7$ and $10^{14}$ ohm-cm. against said first surface, applying a potential to said receiving member preferably by contacting said receiving member with an electrically conductive member and stripping said receiving member from said first surface while maintaining contiguity, at least in the region where stripping is occurring, between the free surface of said receiving member and an electrically conductive member; whereby an induced electrostatic latent image, which may be the same or opposite in image sense to that of said first electrostatic latent image depending on the magnitude of said applied potential, is formed in said receiving member. The induced electrostatic latent image may be rapidly utilized preferably by developing with electroscopic marking material generally within about the relaxation time of said receiving member.

BRIEF DESCRIPTION OF THE DRAWINGS

FIGS. 1-7 are partially schematic.

DESCRIPTION OF THE PREFERRED EMBODIMENTS

Figure 1:
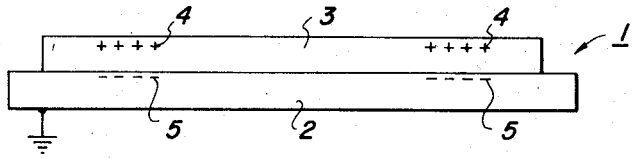
FIG. 1 is a drawing of a xerographic plate.

Referring more particularly to the invention hereof, it generally comprises the following steps:

(1) Providing an electrostatic latent image bearing first surface, for example, by forming a latent electrostatic image on an insulating layer.

(2) Positioning against i.e., applying to the surface of said layer a sheet of relatively conductive receiving material such as paper, i.e., such that the sheet has a resistivity between about $10^7$ and $10^{14}$ ohm-cm.

(3) Applying a potential to the back, i.e., free surface of said receiving member, at least in those portions desired to be imaged.

Any suitable means of applying a potential, which may be negative, positive, alternating (AC), a grounded, ungrounded or biased conductor, to the free surface may be used including depositing a layer of charges such as ionized air on the free surface the charges being produced by any suitable means such as conventional corona discharge devices, for example, of the general description and generally operated as disclosed in Vyverberg Pat. No. 2,836,725 and Walkup Pat. No. 2,777,957.

Any suitable source of corona, which may be negative, positive or AC, may be used including radioactive sources as described in Dessauer, Mott, Bogdonoff Photo Eng. 6, 250 (1955). However, other charging techniques ranging from rubbing the member, to induction charging, for example, as described in Walkup Pat. 2,934,649 are available in the art.

Where substrate 5 is conductive it typically will be grounded when the charge is applied. Where substrate 5 is an insulating material, charging of the member, for example, may be accomplished by placing the insulating substrate in contact with a conductive member, preferably grounded during charging. Alternatively, other methods known in the art of xerography for charging xerographic plates having insulating backings may be applied. For example, the member may be charged using double sided corona charging techniques where two oppositely charged corona charging devices one on each side of the member are traversed in register relative to plate 1.

However, it is preferred inter alia because of the resulting machine simplicity, that the potential be applied by applying a conductive member ungrounded, grounded or at a bias in direct contact with the free surface of the receiving member. Optimally, for the same reasons, the conductive member is at least one roller although a series of rollers or a belt may be used to extend the duration of conductive member contact. The bias on the conductive member which may be of either polarity is preferably in the order of between (and including) ground and not exceeding the bias which would produce a field, between said first surface and the contacting surface of the receiving member sufficient to produce field discharge, since this in effect destroys the output of multiple copy from a single electrostataic latent image feature of this invention.

To produce a positive to positive or negative to negative imaging system, i.e., inducing an electrostatic latent image in the receiving member which is the same image sense as the master image on the first surface, the bias optimally applied by direct contact with a conductive member is optimally about the potential (and the same polarity) as the lower charge portions of the electrostatic latent image on said first surface.

If a positive to negative or negative to positive imaging system is desired, i.e., the electrostatic latent image induced in the receiving member is opposite in image sense to the master image than optimally, for densest images with cleanest backgrounds, the magnitude of the applied potential is preferably about (and of the same polarity) as that of the higher charged areas of the master latent image. Images induced in the receiving member are opposite in sense to the latent image on the first surface and are contiguous with the lower charged areas of the first surface. This induced image will be of charges of the same polarity as that of the master electrostatic latent image on the image support member.

However, in either of the image sense modes spoken of above, the potentials, in either polarities, may be increased to levels substantially higher than the background areas or image areas of the electrostatic latent image, respectively, with the result that images are produced but generally of a lower quality.

Figure 8:
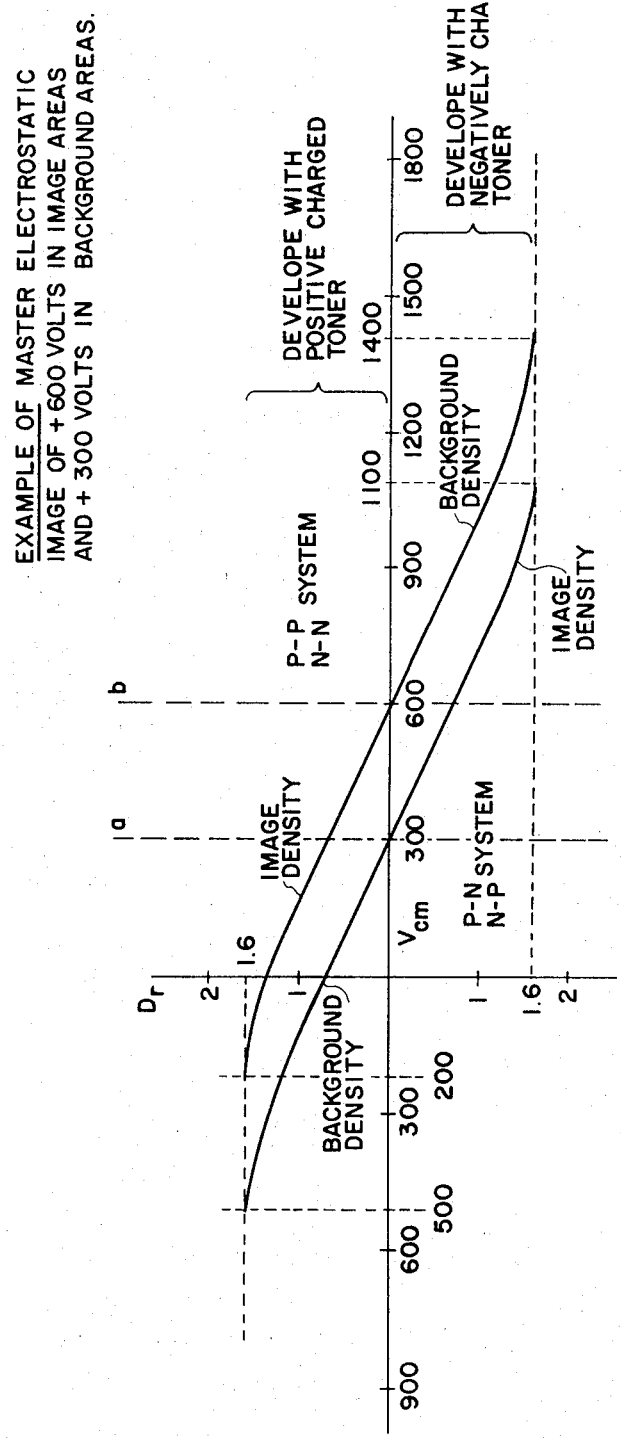
FIG. 8 is a graph of image and background densities $D_r$ of one example of a toner developed electrostatic latent image induced in a receiving member according to the invention versus the bias in volts $C_{cm}$ on the electrically conductive member contacted to the free surface of the receiving member.

This is further illustrated with respect to FIG. 8 which is a graph showing $D_r$ versus $V_{cm}$ for the one illustrative example of a master electrostatic latent image formed, for example, on a xerographic plate where after charging and exposure the electrostatic latent image areas have a surface potential of about +600 volts and the background (the light struck areas) have been discharged to a potential of about +300 volts. $D_r$=density of a toner developed latent electrostatic image induced on an ordinary paper receiving member according to the invention for various potentials or biases on the conductive member ($V_{cm}$) graphically showing the variations in image density and background density.

Density of the image or background developed on the receiving member=$D_r$=log of $1/R$ where R equals the ratio of reflected light to incident light. For example, in a very dense area of a toner developed receiving member where only one-tenth of the incident light is reflected back to the eye of the viewer, R would equal $\frac{1}{10}$ and the log of $1/R$, i.e. density, of course would be 1. A density of 1.3 is where about $\frac{1}{20}$ of the incident light is reflected back to the viewer. Practically, a density of anywhere from about 1.2-1.5 or above appears to the unaided human eye as a very dense black.

For conventional xerographic development systems using a dense black marking material, such fully charged areas of the plate will typically develop out to densities of from about 1.2-1.4 with a maximum of about 1.6.

In the P-P or the N-N mode hereof, optimally for densest images with cleanest background the bias on the conductive member should be at about +300 volts which is shown by vertical dashed line "a" would give a theoretically absolutely clean or "o" background density with an image density of about 0.7, with development of the negative polarity induced image by positively charged toners. In the same situation if a grounded or ungrounded conductive member is used, i.e., 0 volt, there will be a noticeable background density of about 0.7 and also as illustrated by the vertical axis Y the image area density would be about 1.4 which would produce a readily viewable image with background. As the applied potential changes to a negative potential and increases to about −200 volts the image areas will assume the maximum density capable from such a xerographic system of about 1.6. As the negative potential is increased to about −500 volts the background density also reaches about 1.6, all contrast is lost and a solid black toner page is produced.

Still in reference to FIG. 8, a P-N, N-P imaging system results, optimally when the bias on the conductive member is at about +600 volts, represented by vertical dashed line "b" which gives a theoretically clean or "o" background density (it is noted the curve which represents image density above the X axis represents background density below the X axis because of the opposite image sense imaging system and because we're now developing a positive polarity induced image with negatively charged toner). Image density is about 0.7. As the applied potential increases to +1100 volts the image density increases to a maximum of about 1.6 and when the bias is increased to about +1400 volts the background also reaches a density of about 1.6, all contrast is lost and a solid black toner page is produced.

(4) Stripping said sheet of receiving material from said layer, in the presence of a field to avoid field discharge or breakdown to thereby preserve the electrostatic latent image on the first surface. This stripping in a field is accomplished by stripping said sheet while maintaining contiguity, at least in the region where stripping is occurring, between the free surface of said receiving member and an electrically conductive member ungrounded or at a bias in the order of between ground and not to exceed the bias which would produce a field, between said first surface and the bottom surface of the receiving member sufficient to produce field discharge, since field discharge, as above for the (3) potential applying step, in effect destroys the output of multiple copy from a single electrostatic latent image feature of this invention. Also, field discharge in this step would also substantially degrade even the first induced image. Preferably for best quality images the electrical condition or bias of the electrically conductive member during stripping should match or be about the same as the potential applied during the potential applying step (3).

The final basic step is (5) utilizing the electrostatic latent image induced in the receiving member, for example, by applying electroscopic marking material to either surface (or both surfaces, for example, which may be beneficial to increase contrast density where the receiving member is transparent and, when imaged, is to be used as a projection transparency) of the receiving sheet preferably within a period beginning with stripping and extending over a period not greater than about the relaxation time of the receiving member material and typically fixing to the receiving member the marking material which is attracted to the receiving sheet in image configuration. While it is often desirable to develop the induced latent electrostatic image with toner, the induced image may be used in a host of other ways, for example, electrostatic scanning systems may be used to "read" the latent electrostatic image or the induced image may be transferred by TESI techniques to insulators which may hold it for a longer period of time.

Figure 2A:
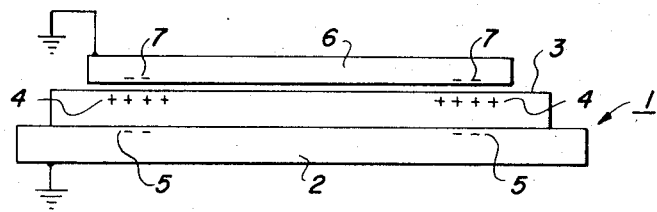
FIGS. 2A and 2B illustrate embodiments of the present invention with different potentials applied to the receiving member 6 resulting in an opposite polarity, same image sense induced image and a same polarity, opposite image sense induced image, respectively.

Apparently, in the embodiment illustrated in FIG. 2A where the potential applied during step (3) is the same polarity and about the magnitude of the lower charge or background portions of the master electrostatic latent image the receiving sheets is induction charged in a pattern conforming (but opposite in polarity) to the electrostatic latent image on first surface. Also, apparently in the embodiment illustrated in FIG. 2B, where the potential applied during step (3) is the same polarity and about the magnitude of the higher charged or image areas of the master electrostatic latent image the receiving sheet is induction charged in a pattern opposite in image sense and of the same polarity as the electrostatic latent image on the first surface. The receiving sheet is at least slightly conductive, so the electrostatic latent image is induced in the receiving sheet rather than on it; as would be the case if the sheet were an insulator. This induced image should preferably be developed simultaneously or substantially simultaneously with stripping from the layer. This permits the toner to be attracted to the strongest possible induced image to be developed. Contact of an electrically conductive developer such as in magnetic brush development or liquid roller development prior to stripping may produce the electrically conductive member contacting step of (3) above. The induced electrostatic image should preferably be developed within the relaxation time but may be done at any time before the induced potential decays, i.e., is substantially completely decayed, but with slightly poorer density and resolution. Then a second sheet may be placed on the first surface layer bearing the master electrostatic latent image and the stripping and developing steps may be repeated. The electrostatic latent image on the insulating layer is substantially unaffected by these steps providing the field presence to avoid field discharge or breakdown in step (4) is used and therefore, a great many copies may be made before the master electrostatic latent image decays excessively.

The sheet of receiving material may be stripped from the imaged layer and the rest of the process automated at a rate of from about 2 to about 40, and even up to about 100 inches per second, and produce satisfactory images. Development speed appears to be the factor limiting the overall speed of the system.

For example, in the preferred magnetic brush and liquid roller development modes hereof, it is preferred for optimum quality images that the stripping and developing operations take place at about 24–48 inches per second since this rate produces optimum image quality consonant with rapid production of copies. Optimum speed is determined largely by the best compromise under a particular set of circumstances between image sharpness, i.e., resolution which increases as speeds go higher and image density which decreases at higher speeds.

Magnetic brush development produced satisfactorily dense images at speeds between about 12 and 48 inches/second and optimum quality images between about 24 and 48 inches/second with the magnetic brush rotating between about 40 to 80 r.p.m. or at a surface speed of from about 4–8 inches/second in the same direction as the advance of the paper. Under these conditions, image density was typically about 0.8 with background density not exceeding 0.1. For magnetic brush development images have been produced at speeds as high as about 100 inches/second with highest quality images produced up to speeds of about 65 inches/second. Between 65 and 100 inches/second the images showed a loss of density. The development speed appears to be controlled by mechanical and inertial properties, in the preferred imaging methods of the magnetic brush device or liquid roller development. While the combination of time (speed) and conductivity effect the extent to which the image is induced and dissipated, the more consequential effect of speed proved to be completeness of the image development. The preferred toner to carrier ratio in magnetic brush development was from about 1 to 3%, with optimum at about 2%. Excessive toner concentration gives dense images but higher background while too little toner results in cleaner background but low image density and some deposition of iron filings on the paper.

For optimum image density and resolution, the induced electrostatic latent image in the transfer sheet should be developed within the "relaxation time" of the materials used. This relaxation time period may be empirically determined for the particular transfer sheet material to be used. If positive and negative charges are applied, for example, by corona means, to opposite sides of the transfer sheet to be later developed, the potential difference will decay according to the equation:

$$\Delta V_t = \Delta V_o e^{-\frac{t}{\tau_r}}$$

where $\tau_r$ is the "relaxation time" constant, empirically determined. In a time $$\tau_{rt}\ \Delta V_t = \frac{\Delta V_o}{e}$$

($e$ being the base of natural logarithms, about 2.71828). In these equations, $\Delta V_t$ is the potential difference after time $t$ and $\Delta V_o$ is the originally applied potential difference. Therefore, if an induced image is developed within a time period where $t$ is less than $\tau_r$, the potential difference will be at least 40% (or 36.87% to be more exact) of the originally induced potential. It has been found that uniform high image quality may be attained where each copy is developed within this time; the "relaxation time" of the material.

Of course, it is obvious to one of ordinary skill in the art that in view of the immediately preceding paragraph and in view of the specification and the originally filed claims of 467,445 and of course, even more clearly so in view of the additional disclosure of this application that:

(a) The above is merely a form of representing the well known formula which relates the time $\tau_r$ in seconds for surface charge on a material (no matter what the surface potential bias or polarity) to decay to $1/e$ or exactly 36.87%, i.e., about 40% of its initial surface potential. This well known formula is $\tau_r = 8.85 \times 10^{-14} K\rho$ where the numerical constant has the units seconds cms./ohm; $K$ is the dielectric constant of the material and $\rho$ is the volume resistivity (in ohm-cm.) of the material. Rounding off and assuming typical dielectric constants of about 1-3, the equation becomes $\tau_r = \rho \times 10^{-13}$. This means that for a receiving member of a material with a bulk resistivity of about $10^{13}$ ohm-cm., $\tau_r$ would equal about 1 second, which means that the relaxation time $\tau_r$ varies from about $10^{-6}$ seconds to about 10 seconds respectively for receiving members of a material having a resistivity from about $10^7$ to about $10^{14}$ ohm-cm.

(b) In the potential applying step (3) hereof the free surface of the receiving member should have a potential applied and in a preferred embodiment be contacted with an electrically conductive member for a minimum time period equal to about the relaxation time of the particular receiving member being used, said relaxation time varying from about $10^{-6}$ seconds to about 10 seconds respectively for receiving members having a resistivity between about $10^7$ to about $10^{14}$ ohm-cm. in order to produce solid area coverage. This preferred technique where the electrostatic image is induced, i.e., produced or created, in the receiving member may be thought of merely as the reverse of decay in that if contacting is carried out for this minimum period the field in the interior of the solid area portions will be raised to about 60% or specifically to 63.13% of the maximum value which equals the strength of the fringe field. This is sufficient for substantial solid area development. Even more exactly contacting or the potential applying step should be for a minimum time equal to about the induction time which depends on the particular receiving member being used and the spacings between same and the first surface.

The induction time constant $\tau_i$, which is the minimum time the "positioning" of step (2) and the "contacting" of step (3) should take place is dependent upon the bulk resistivity of the receiving member material, for example paper, the thickness $t_p$ of the receiving member, and the spacing $t_a$ of the air gap between the first surface and the bottom surface of the receiving member.

$$\tau_i = 8.85 \times 10^{-14} \rho_p \frac{t_p}{t_a}$$

$t_p/t_a$ for thinner receiving members such as 20 micron paper with relatively rough first surfaces and receiving member surfaces which result in relatively larger $t_a$ spacings, for example, of about 20 microns would result in a $t_p/t_a$ factor of about 1. This means that $\tau_i$ for receiving members having a resistivity between about $10^7$ to about $10^{14}$ ohm-cm. would vary respectively from about $10^{-6}$ sec. to about 10 seconds. However, for thicker receiving members such as 3 mil or 75 micron paper which has a relatively smooth surface and wherein, for example, $t_a$ would be around 7 or 7½ microns the factor $t_p/t_a$ would equal 10. Thus $\tau_i$ for receiving members having a resistivity between about $10^7$ to about $10^{14}$ ohm-cm. would vary from about $10^{-5}$ seconds to about 100 seconds, respectively. The relaxation time constant of the paper after separation, however, as previously pointed out is independent of the paper thickness, and is related only to the paper dielectric constant and the bulk resistivity $$\tau_r = 8.85 \times 10^{-14} \times K_p \rho_p$$

The effective air gap $t_a$ will be affected by the surface smoothness of the paper and the applied contact pressure. In practice, indications are that it is between 1 and about 7 microns for the smoother finish papers.

For common papers of 50 to 100 microns thickness, and assuming a dielectric constant of about 3, the ratio of induction time to relaxation time will therefore be at least about 3 to 1 and might be as high as 30 to 1. Optimally, then, the time that the paper or other receiving member is positioned in nominal contact with the master image should be at least 3 to 30 times longer than the time between separation and development. For practical reasons in our equipment the ratio was typically fixed at about 10 to 1. In addition, the paper typically was not contacted with a conductive member throughout the entire region of contact between the paper and the master electrostatic image.

The insulating member 1, which bears the electrostatic latent image may be made up of any material capable of holding an electrostatic charge for sufficient time to permit the desired number of copies to be made. For example, the layer might be glass or a resin such as Lucite 2042, an ethyl methacrylate polymer or Mylar, polyethylene terephthalate; Teflon, polytetrafluoroethylene; and Tedlar, polyvinyl fluoride; all available from E. I. du Pont de Nemours and Co., Inc.; Staybelite resins, a family of thermoplastic synthetic resins prepared from hydrogenated rosin and available from Hercules Powder Co.; styrene polymers such as Velsicol, a styrene terpolymer available commercially from the Velsicol Chemical Corp.; and Piccolastic resins, styrene polymers available from the Pennsylvania Industrial Chemical Corp; ethyl cellulose; cellulose acetate; polycarbonates such as Plestar commercially available from General Aniline and Film Co.; polyethylene; polypropylene; polymeric materials such as casein and Parlon-P, the latter being a chlorinated natural rubber available from Hercules Powder Co.; and polyvinyl chloride. On such a surface an electrostatic charge may be deposited in image configuration, such as by corona discharge through a stencil. While this charge will gradually dissipate due to the inherent dark decay characteristics of the material, the charge will remain for sufficient time for a plurality of copies to be made by the process of this invention. On the other hand, the electrostatic latent image may be formed on a photoconductive insulating surface such as is described in U.S. Pat. 2,297,691 by Carlson. When such a material is used, the surface of the layer is uniformly charged as by corona discharge in the dark, then the surface is exposed to a light- and shadow image. Because of the layer's photoconductive characteristics, the charge will be dissipated in those areas which are struck by light. The charge will remain in the nonlight struck areas. This charge will gradually be dissipated due to the dark decay characteristics of the material. However, the charge will remain for sufficient time to produce a plurality of copies by the process of this invention. Typical photoconductive materials which are suitable for use in the electrostatic latent image bearing layer useful in the process of this invention are vitreous selenium, sulfur, anthracene, inorganic photoconductive pigments such as zinc oxide, lead oxide, cadmium sulfide or cadium sulfoselenide dispersed in inert or photoconductive binder resins, organic photoconductive pigments such as phthalocyanine and sensitized polyvinyl carbazole in inert binder resins, homogeneous layer of organic photoconductive materials, and charge-transfer complexes of Lewis acids and aromatic resins such as are disclosed in copending application 426,409 filed Jan. 18, 1965, now U.S. Pat. 3,408,183.

The conductive support material utilized in conjunction with the photoreceptors are those of the conventional materials such as aluminum, brass, copper, zinc, conductive paper, and any suitable plastic substrate or the like having the necessary conductivity properties or overlayered with a conductor.

The receiving sheet which is induction charged in image configuration and on which a visible image is then formed may be made from a wide variety of materials. It is necessary that the receiving sheet have a resistivity ranging from about $10^7$ ohm-cm. to about $10^{14}$ ohm-cm. Within this range, it is preferred that the resistivity of the receiving sheet range from about $10^9$ ohm-cm. to about $10^{12}$ ohm-cm. and optimally between about $2 \times 10^{10}$ to about $2 \times 10^{12}$ ohm-mc. This is so because assuming the practical machine realities that image induction typically takes place, for example, over about 6 inches of drum travel, and development occurs within ¾ to 1 inch after separation, at speeds of about 24 inches/second the induction time constant should be less than about ¼ second and the relaxation time constant must be longer than about 1/20 second. Equations for $\tau_r$ and $\tau_i$ suggest that in order to satisfy these requirements the bulk resistivity of the paper optimally should be about $2 \times 10^{11}$ ohm-cm. Higher resistivity and/or higher surface speed will result in reduced charge induction, while lower resistivity and/or lower surface speed permits loss of image density and resolution by relaxation of the fields within the paper before development can take place. Tests show that high image quality is maintained over a range of about 2 orders of magnitude; that is, a factor of 10 above and below the optimum value. Paper is an especially suitable and desirable material since at ordinarily encountered humidities ranging from 75% RH to 5% RH, the conductivity is within the acceptable range and it is inexpensive and readily available. For operation at RH above about 50% it is desirable for best quality images to use a "dry box" to keep the paper resistivity in the optimum range which results at an RH of from about 50% to about 20%.

Referring now to FIG. 1, there is seen a photoconductive plate 1 made up of a grounded conductive substrate 2 having coated thereon a layer of a photoconductor 3. The photoconductor 3 has on its surface a positive latent electrostatic image, indicated by the positive charge signs shown at 4. The image sense and polarity of this master latent image may of course be positive or negative. Corresponding to this positive charge image 4, there is a pattern of negative charges 5 at the substrate-photoconductor interface. The latent electrostatic image may be formed by any conventional method. For example, the surface of the photoconductor may be uniformly charged and then exposed to a light in image configuration. Alternatively, the charged pattern may be impressed on the photoconductor surface in image configuration. Various methods of forming latent electrostatic images are disclosed by Carlson in U.S. Pat. 2,297,691. Other methods of forming the electrostatic charge pattern may be used such as, for example, selective deposition of electrostatic charge, as by impressing a charge through an image stencil onto an insulating surface to form a pattern of the charge, imposing a potential on a shaped conductor or electrode, cathode ray tube image presentation of computer generated information to a uniformly charged photoconductive substance or the like. Thus, the image may be formed utilizing photosensitive materials as herein illustrated or by any one of the above mentioned conventional techniques. In conventional xerography, the latent electrostatic image as shown in FIG. 1 would be developed by applying toner thereto and then transferring the toner to a receiving sheet on which it would be fixed. The present invention, however, proposes the "transfer" of the electrostatic image by induction is a receiving sheet.

Figure 2B:
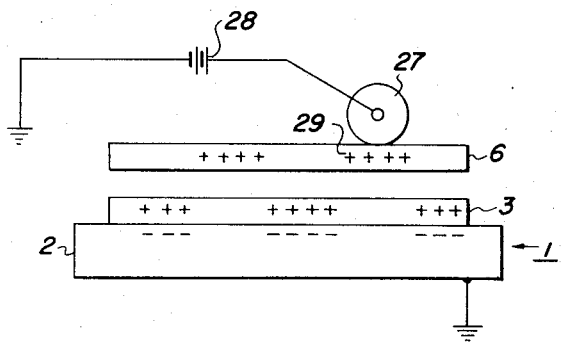

FIGS. 2A and 2B show two modes of contacting the free surface of the receiving sheet with an electrically conductive member. A receiving sheet 6 is positioned on the surface of the photoconductor 3. This receiving sheet may be made up of any material having a resistivity of between about $10^7$ to about $10^{14}$ ohm-cm. and for example about $10^{10}$ ohm-cm. Typical of these materials are many types of paper, cellophane, cellulose acetate. As can be seen in FIG. 2A, an induced charge pattern 7 is formed corresponding to the original image 4. As is indicated in FIG. 2A, the total negative charges at the substrate-photoconductor interface as shown at 5 and the induced negative charge 7 together equal to the original positive charge pattern 4.

As illustrated in FIG. 2B, the image support member 1 is disposed in contact or virtual contact with the surface of an induction sheet, i.e., receiving member 6 separated from member 1 only by a very thin air gap. A conductive roller 27 with potential source 28 connected thereto is passed across the outer or free surface of the sheet structure. While the image support member is in contact with the sheet a potential is applied to the conductive roller 27 matching that of the master latent image. As a result of the applied potential an image 29 is induced in the sheet material contiguous with the relatively non-charged areas of the image support member, the induced image having the same polarity as the charges of the master latent image.

Figure 3A:
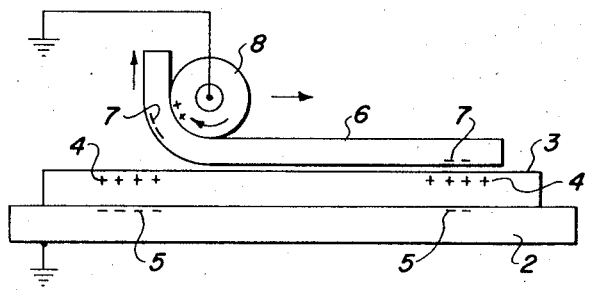
FIGS. 3A and 3B illustrate embodiments of the stripping step of the present invention stripping taking place with the receiving member 6 contiguous an electrically conductive member.

As shown in FIG. 3A, which is a continuation of the process shown in FIGS. 1 and 2A, when the receiving sheet 6 is stripped from the photoconductor 3 while the top, i.e., free, surface of the receiving sheet is grounded as by roller 8, the charge is automatically balanced. To provide a uniform ground, the grounded roller 8 is preferably rolled across the top surface of receiving sheet 6 before the stripping step. Instead of being grounded, roller 8 may, and for optimum quality images should, be held at about the potential and at the same polarity as the exposed areas on photoconductor 3. This potential is generally less than about 100 volts but may be as high as 300 or 400 volts. For example, in the well-known Xerox 914 copier, the amorphous selenium photoconductor xerographic drum, typically is initially positively charged to about 800 volts. In the discharged areas, after exposure, the discharge is nowhere near ground potential but is to about 150–200 volts. In the other well-known, commercially successful, electrophotographic system using a zinc oxide photoconductor layer on a paper substrate, typically the photoconductor is initially charged negatively to about 350 volts with the surface potential in the discharged areas after exposure being about 40–80 volts. Optimum quality images, i.e., images with clean, i.e., very low background, result if the potential or bias of the electrically conductive member during the contacting step is at a bias in the order of about the potential and of the same polarity as the lower charged background portions. Of course, as has been pointed out herein, satisfactory images with increasingly higher backgrounds result if the electrical potential is lowered or changed to an opposite potential with P-N; N-P system resulting if the potential is increased. As shown, especially with reference to FIG. 8, it is preferred but not necessary to obtain images, that this potential of the electrically conductive member be of the same polarity as the charge on the original electrostatic latent image bearing surface. This may be preferred over simply grounding roller 8 in that it results in a final developed image of higher contrast with less deposition of unwanted electroscopic marking material in background areas.

Figure 3B:
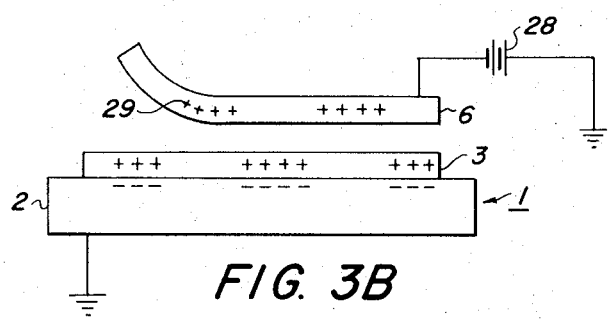

As illustrated in FIG. 3B, when the induction material 6 is stripped from the electrostatic image bearing member 1 the induced image 29 is readily detected. To ensure a uniform applied potential the roller is preferably passed across the entire free surface of the induction sheet before the stripping step.

The step of stripping the receiving member with the induced electrostatic latent image while the top surface of the receiving sheet is contiguous an electrically conductive member is essential to the preservation of the original electrostatic latent image on the photoconductor 3. As can be seen in FIG. 3A, the grounded roller 8 and substrate 2 provide a path through which the induced potential in receiving sheet 6 can be balanced without air breakdown across the gap between, for example, original image 4 and induced image 7. As can be seen, the charge pattern on the photoconductor after the receiving sheet is stripped therefrom returns to the original state as shown in FIG. 1. Thus, the induction charging of the receiving sheet 6 has no detrimental effect on the positive image on the photoconductor 3. Many additional receiving sheets may then successively be induction charged. The number of receiving sheets which may be charged is essentially limited only by the time in which dark decay causes dissipation of the charge on the photoconductor. Runs of about 100 copies show almost no change in image quality but degradation sets in inter alia between about 100 and 200 prints because of some discharge of the master electrostatic latent image from the first surface and because of some discharge from the points of relatively infrequent direct contact of receiving member to first surface.

In the exemplary showing in FIG. 2A, the negative charges which balance the positive charge in the photoconductor 3 are shown as evenly balanced between the charges at the substrate-photoconductor interface and in the receiving sheet. This will not always be the case. It will generally be desirable to have higher charge density in the receiving sheet than at the substrate-photoconductor interface. When a receiving sheet such as paper is placed on the photoconductive layer, it will not come into uniform contact with the photoconductive layer. There will always be limited, point-like contact between the receiving sheet and the photoconductive surface. Between these contact points, there will be a varying spacing between the two surfaces. This varying space between the sheet 6 and layer 3 is shown schematically in the drawings as a continuous average spacing. This is illustrative only, since there is contact at many spaced points. The charge density in the receiving sheet as opposed to the substrate-photoconductor interface will be in proportion to the capacitance of the average space between the receiving sheet and the photoconductor to the capacitance of the photoconductive layer itself. Thus, the charge density induced in the receiving sheet may be increased by decreasing the average space between the receiving sheet and the photoconductor and/or by decreasing the effective capacitance of the photoconductive layer. Increasing the charge density in the receiving sheet will improve development density without detrimental effects since the original charge density at the substrate-photoconductor interface will be restored automatically when the receiving sheet is stripped from the photoconductor surface.

Figure 4:
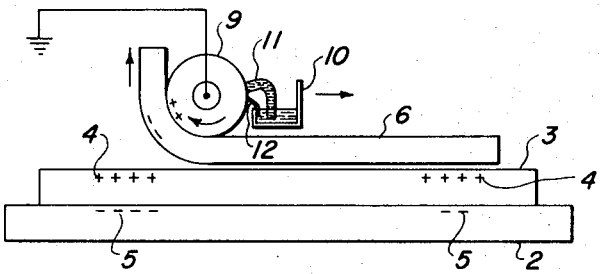
FIG. 4 is a drawing illustrating an embodiment of the invention providing for top or free surface development with preferred liquid roller development.
Figure 5:
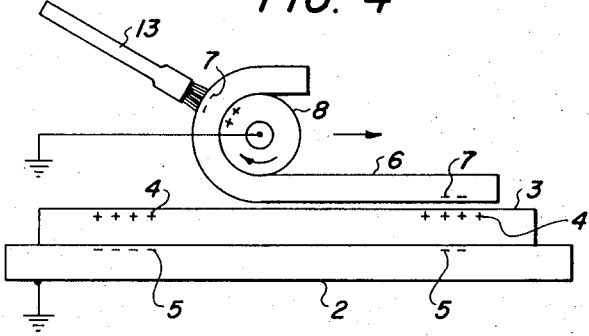
FIG. 5 is a drawing of an embodiment of the invention showing bottom side development with the other preferred development means, magnetic brush and stripping while in contact with a conductive roller.

FIGS. 4 and 5 show two exemplary and preferred development methods useful in developing the electrostatic latent image induced in the receiving sheet 6. The development method shown schematically in FIG. 4 utilizes a gravure roller 9 having on its surface very small closely spaced depressions. This method of electrostatic image development is described in detail in U.S. Pat. 3,084,043. Ink from a reservoir 10 is wiped onto the gravure roller by means of wick 11. The ink fills the depressions in the roller surface. Doctor blade 12 removes excess ink from the lands between depressions and returns it to the reservoir. As the receiving sheet 6 is stripped from the photoconductor 3, it passes against the rotatable gravure roller. Ink is attracted from the depressions by the charge in image configuration, thereby depositing ink on the sheet in image configuration. While in this exemplary instance, the top or free surface of the receiving sheet is developed one might alternatively develop the same negative charge pattern from the bottom side of the stripped receiving sheet. The latter method is more sensitive to humidity since access time is relatively longer compared with the former method in which development takes place simultaneously with the generation of fields by stripping. However, some image sharpness is lost in top, free surface development because of geometric factors of the electrostatic field spreading through the thickness of the paper.

Empirically it has been established that the maximum resolution $R_{max}$, in line pairs/mm. for top, free surface development $\cong 300/t$ where $t =$ the receiving member thickness in microns. For bottom surface development, resolutions of 8 l.p./mm. were obtained on thick and thin receiving members. The problem of air ionization is preferably solved by ensuring that the paper is kept contiguous a conductor at ground or at a bias as described during separation or stripping from the master image. This reduces the field between the paper and the master image to values below the critical stress which causes ionization and which tends to destroy the master electrostatic image. In the bottom surface mode of development, the paper is preferably backed up with a conductive roller during separation from the master image. In the free surface mode, the conductive backup is preferably provided by the developer member itself, a magnetic brush or liquid developer roller.

These modes of development are preferred inter alia because the developing member may also serve as the electrically conductive member which applies the potential of step (3) and which supplies the contiguous conductive member during "stripping." In the case of free surface development using a magnetic brush system using a conductive developer, the conductive developer serves as the contiguous electrically conductive member used in the stripping step in order to prevent ionization at the point of separation of the induction material and the image support member. By conductive developer is meant a development system which includes at least one conductive element. When bottom surface development is practiced, the free surface of the induction sheet or web is typically contacted with a roller which serves as the contiguous electrically conductive member during stripping of the induction material from the image support member. This is necessary to reduce the field within the separation gap and thereby preserve both the induced image and the master image. The liquid development mode of FIG. 4 is additionally preferred and is the optimum development mode herein because in addition to the above enumerated advantages, and its simplicity, it often provides for a self-fixing feature in that for relatively absorbent receiving members such as many types of paper, the toner and the liquid carrier are absorbed into the receiving sheet, the toner being absorbed into the fibers of the receiving member whereupon the carrier liquid being evaporated provides for a fixed image.

Referring now to FIG. 5, as the receiving sheet is stripped from the photoconductor, 3, it passes against the conductive roller 8 thereby inducing positive charge in image configuration in the roller 8. It is this capacitance with roller 8 that prevents discharge of the negative charge to the photoconductive surface by air ionization. The negative charge image is then developed by a magnetic brush means 13. This magnetic brush 13 consists of a magnet on the surface of which is held a magnetic carrier with which is mixed a toner material. The magnetic field holds the carrier particles in a brush-like configuration. As this brush passes over imaged areas, toner particles are attracted to the receiving sheet from the brush. Such magnetic brush development is described in detail in U.S. Pats. 2,930,351 and 3,058,444.

While the above development methods as shown in FIGS. 4 and 5 are preferred any suitable xerographic development system may be used to develop the induced electrostatic latent image. The only limitation is that development must take place within a short time after the receiving sheet is stripped from the photoconductive layer. Typical xerographic development methods which may be effectively used to develop the induced electrostatic image include cascade development as described by Walkup in U.S. Pat. 2,618,551, skid development as described by Mayo in U.S. Pat. 2,895,847, powder cloud development as described by Carlson in U.S. Pat. 2,221,776, liquid development as described by Mayo et al. in U.S. Pat. 2,891,911, etc.

Figure 6:
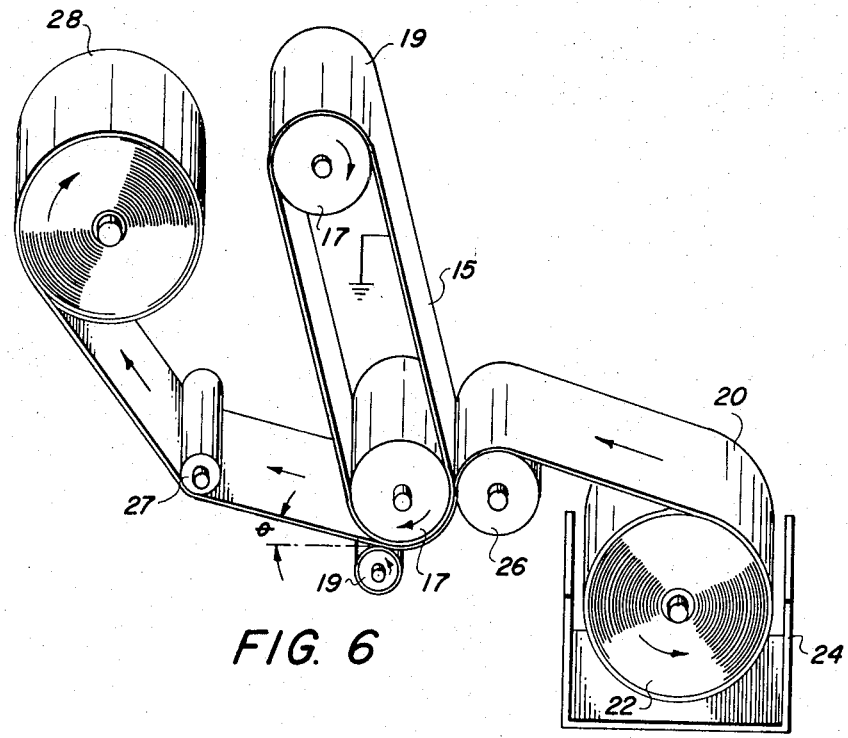
FIGS. 6 and 7 are drawings of apparatus for carrying out an embodiment of the invention.

Referring now to FIG. 6 there is shown a partially schematic drawing of apparatus for carrying out an embodiment of free surface development according to the invention. 15 is a flexible xerographic plate advancing in a clockwise direction around insulated rollers 17. A receiving member web 20, preferably paper in most instances is advanced in the direction of the arrows from the supply roll 22, which may be enclosed in a dry box arrangement 24, around roller 26, into contact with the electrostatic latent image bearing surface of the photoconductor, past magnetic brush developing means 19, past guide roller 27 onto receiving web take-up roll, 28.

Magnetic brush developing means, 19, is movably mounted so that its position with respect to the line of separation from the paper of the xerographic drum may be varied. The distance from the magnetic brush and drum axis also is variable so that its interference with the drum surface may be adjusted. Developer material was Fisher Iron (100 mesh alcoholized iron filings), from Fisher Scientific Co., Fairlawn, N.J. and an electrically positive xerographic toner, for example, of an average size of about 13 microns made as disclosed in Insalaco Pat. 2,892,794.

The developed image may be fixed to the surface of the particular induction sheet or, in the case of when a continuous web-like material is utilized, transferred to a secondary receiving copy sheet. The final copy sheet may consist of conventional opaque, moisture absorbing copy paper or humidity sensitive and insensitive material of any desired thickness. Typical such materials include ordinary bond paper and resinous transfer materials such as Mylar, polypropylene, polyethylene, Tedlar, and the like. The transfer of the toner powder image or electroscopic marking particles may be made by any suitable technique such as by electrostatic transfer which entails the subjecting of the free surface of the copy sheet to an electrostatic or corona charge opposite to the polarity of the toner particles. Other transfer techniques may be utilized such as adhesive or contact pressure procedures. The image is then fixed to the surface of the final copy sheet, whether it be the original induction material or a secondary receiving material, by one of a number of available techniques such as heat fusing, vapor fusing, or by applying a laminate over the transferred toner particles.

It is found that when a dry box 24, is employed the box need not be especially well sealed, i.e., it need not seal out moisture but must simply maintain the air inside at the stated temperature increment over the room temperature. The paper showed no noticeable change if it was processed within about 30 seconds after leaving the dry box. It was found that a low wattage light bulb maintained the inside of the dry box about 20° C. above the outside ambient room temperature which kept the RH in the dry box in the optimum range of from about 20% to 50% for even the maximum ambient indoor RH of about 90%.

When the magnetic brush unit developed the paper before the line of separation from the xerographic drum, weak, i.e., lower density, images resulted. If the entire brush contact zone was located well after the line of separation of the paper from the drum, some sparking occurred and image density was reduced. The optimum results were obtained when the magnetic brush was located so that its band of contact started at the line of paper separation and extended through separation.

Figure 7:
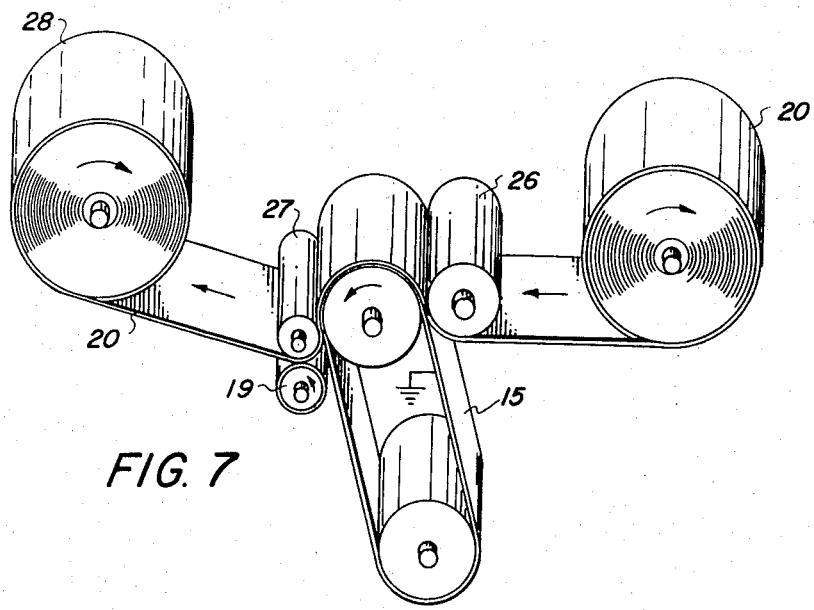

FIG. 7 is a similar configuration showing bottom surface development.

While both FIGS. 6 and 7 have guide rollers guiding the image receiving web 20 into contact with the electrostatic master image another desirable embodiment, especially where the receiving member is in web form is to just hold the web taut in contact with the electrostatic master image with no guide rolls which eliminates any possibility of charge build-up on the guide rolls.

To further define the specifics of the present invention the following examples are intended to illustrate and not limit the particulars of the present invention. Parts and percentages are by weight unless otherwise indicated. The examples are also intended to illustrate various preferred embodiments of the present invention. Examples I–VIII are directed to the P-P-N-N mode hereof while Examples IX–XIV are directed to the P-N; N-P mode hereof.

Example I

A xerographic plate comprising an aluminum substrate having a 50 micron layer of vitreous selenium coated thereon is uniformly charged to a potential of about 800 volts, by means of corona discharge in the dark. A right-reading light-and-shadow pattern is projected onto the charged plate, thereby dissipating the charge in light-struck areas. A sheet of Baylawn Manifold 9 lb. substance paper (made by Green Bay Tissue Mills) which has been maintained at a relative humidity of about 10 percent is positioned on the surface of the plate. The top surface of the paper sheet is engaged with a conductive rubber roller at a potential of about +100 volts applied. The paper sheet is then stripped from the plate at a rate of about 10 inches per second. During stripping the top surface at the point of separation is in contact with a conductive magnetic brush developing member held at a potential of about 100 volts; such as is described in U.S. Pat. 2,930,-351. Toner particles are deposited in a pattern conforming to the original. The paper sheet bearing the powder image is heated to the fusing point of the toner and then cooled, thereby permanently fixing the image. An excellent image of high density and sharpness of about 10 line pairs per millimeter, is observed. The above process is repeated 25 times with 25 additional sheets of paper. The quality of the images on these sheets continues to be excellent. A very slight, almost unnoticeable decrease in image density is observed. This is due to the dark decay characteristics of the photoconductive layer. This gradual dissipation of the charges in the photoconductive layer is so gradual, however, that a very great number of satisfactory copies may be made from a single image.

Example II

The process steps of Example I above are repeated, using paper having a relative humidity of about 30 percent. The quality of the images produced is again excellent, however, maximum resolution is reduced to about 4 line pairs per mm. Again, a plurality of duplicate copies may be made with little loss in quality.

Example III

The process steps of Example I above are repeated, using paper having a relative humidity of about 50 percent. The images prodcued are still of good density. However, the sharpness is not quite as high as with the images made on paper of lower humidity.

Example IV

The process steps of Example I above are repeated. Here, however, instead of the paper sheet, a sheet of cellophane having a thickness of about 50 microns and a relative humidity of about 50 percent is used. The powder image is fixed to the cellophane by exposing to trichloroethylene vapors. Excellent images result and again a plurality of nearly equally good copies can be made.

Example V

A photoconductive plate is charged and imaged as in Example I above. A sheet of Baylawn Manifold 9 lb. substance paper is placed on the photoconductive plate bearing the electrostatic latent image. A metal roller at the potential of the unimaged areas, about +90 volts, is placed in contact with the top surface of the paper sheet. This roller has on its surface a plurality of minute depressions or grooves. These grooves are filled with ink by a wick means such as that shown in FIG. 4. The paper sheet is stripped from the photoconductive surface while in contact with the roller. As the sheet passes the roller ink, is deposited on the sheet in image configuration. An image of good quality but with some undesired ink deposition in background areas is observed. The above process steps, except for the charging to exposing of the photoconductive plate, are repeated with 25 additional sheets of paper. The image observed on the 25th sheet is very nearly of the same quality as that on the first sheet. While some fall-off in quality due to dark decay of the charge on the photoconductive surface is observed, it is apparent that many additional satisfactory copies could be made.

Example VI

The imaging and developing steps are carried out as in Example I. Here, however, the magnetic brush developing member is brought into contact with the lower surface of the paper sheet (at 10% relative humidity) as it is stripped from the plate. This configuration is that shown in FIG. 5. The resulting image is of excellent quality and is sharper than that produced in Example I, since there is no field spreading, because the field does not pass through the paper.

Example VII

The steps of Example VI are repeated with paper at a relative humidity of about 50%. A satisfactory image is produced, though of lower density and sharpness than that of Example VI. The decrease in quality here is a result of the time between stripping of the sheet and development, the paper being more conductive at the higher humidity which permitted more rapid decay of the electrostatic latent image.

Example VIII

A photoconductive plate is charged and imaged as in Example I above. A sheet of Baylawn Manifold paper at a relative humidity of about 10 percent is placed on the plate and the top surface of the sheet is grounded. The sheet is stripped from the plate while in contact with a conductive donor sheet which has on its surface a coating of electroscopic marking material. This material is transferred to the paper sheet in imaged areas. This method of development, generally known as "touchdown" development, is described in detail in copending application, Ser. No. 328,984, filed Dec. 9, 1963. An image of excellent quality is produced. The above process steps are repeated with 25 additional sheets of paper. Image quality is uniformly high, with very slight decrease in quality from the first to the 25th copy.

Example IX

A photoconductor plate comprising an aluminum substrate having a 50 micron layer of vitreous selenium coated thereon is uniformly charged to a potential of about +600 volts by means of a corona discharge in the dark. A cathode ray tube display image is projected onto the surface of the charged plate thereby dissipating the charge in the light struck areas and producing a right reading image. A sheet of Baylawn Manifold 9 pound substance paper made by Green Bay Tissue Mills having a relative humidity of about 10% is positioned on the imaged surface of the plate. The free surface of the paper sheet is charged to a potential of about +600 volts. The paper sheet is then stripped from the plate at a rate of about 10 inches per second. During stripping the top or free surface of the paper sheet is contacted at the point of separation with a conductive magnetic brush developer unit held at a potential of about +600 volts and comprising negatively charged toner particles. Toner particles are deposited in a pattern conforming to the positively charged areas of the induced latent image. The paper sheet bearing the powder image is heated to the fusing point of the toner and then cooled, thereby permanently fixing the image to the induction sheet. An excellent positive image of high density and sharpness of about 10 line pairs per mm. is observed. The above process of positioning, charging to +600 volts, stripping, developing and fusing is repeated 25 times for 25 additional sheets of paper. The quality of the images on these sheets continues to be excellent. A very slight almost unnoticeable decrease in image density is observed, this being due to the dark decay characteristics of the photoconductive layer. This gradual dissipation of the charges in the photoconductive layer does not markedly affect the subsequent quality of the prints produced.

Example X

The process steps of Example IX are repeated using an induction paper having a relative humidity of about 30%. Similar results as obtained in Example IX are demonstrated.

Example XI

A xerographic plate comprising an aluminum substrate having a 50 micron layer of vitreous selenium coated thereon is uniformly charged to a potential of about +600 volts by means of a corona discharge in the dark. A cathode ray display image is projected onto the surface of the charged plate, thereby dissipating the charge in the light struck areas and producing a wrong reading image. The resulting image support member is brought into rotary contact with a doped nylon web 50 microns thick, having a resistivity of about $10^{13}$ ohms-cm. A potential of about +600 volts is applied to the outer surface of the nylon web. During the process of rotation the nylon web becomes separated from the image support member. At the point of separation the free surface of the nylon web is brought into contact with a conductive magnetic brush development member held to a potential of about +600 volts and comprising negatively charged toner particles. Toner particles are deposited in a pattern conforming to the original cathode ray tube display image. The nylon web bearing the powdered image is then in turn contacted with the surface of an ordinary bond paper at a relative humidity of about 20%, the rear surface of which is charged by a corona spray to about +1000 volts. The bond paper is about 4 mils thick. The toner particles are transferred to the paper copy sheet to which they are fused by the application of heat at the fusing point of the toner particles. The resulting right reading image is then cooled, thereby permanently fixing itself to the copy paper. An excellent image of high density and sharpness is obtained. The above process is repeated until a number of copies of the image are produced. The quality of the images on the subsequent sheets of paper continues to be excellent thus demonstrating the multiple imaging capabilities of the present system.

Example XII

The process of Example XI is repeated with the exception that a Tedlar film is substituted for the nylon web. The quality of the images produced is again excellent for the plural number of copies produced. The copy paper to which the resinous image is transferred is at equilibrium with a relative humidity measuring about 50% and is about 3.5 mils thick.

Example XIII

The process steps of Example XI are repeated with the exception that a polyethylene impregnated paper is substituted for the nylon web and the final copy paper is in equilibrium with air at a relative humidity of greater than 75% and has a thickness of about 3.8 mil. Similar results as obtained in Example III are realized.

Example XIV

A photoconductive plate comprising an aluminum substrate having a 50 micron layer of vitreous selenium coated thereon is uniformly charged to a potential of about +600 volts by means of a corona discharge in the dark. A cathode ray tube display image is projected onto the surface of the charged plate thereby dissipating the charge in the light struck areas and producing a wrong reading image. Following the procedure of Example IX an image is induced in a paper induction sheet and the induction sheet separated from the master image support against a conductive rubber roller biased to a potential of about +600 volts. The front surface of the induction paper is contacted with a magnetic brush developer bias to about +600 volts and comprising negatively charged toner particles. The resulting image is heat fixed to the surface of the paper sheet and cooled thereby permanently fixing the image to the induction sheet. High quality images are obtained.

In all of Examples IX–XIV the display portions of the CRT image appear as a black image on the typically lighter background of the receiving member.

Although the present examples were specific in terms of conditions and materials used, any of the above listed typical materials may be substituted when suitable in the above examples with similar results being obtained. In addition to the steps used to carry out the process of the present invention, other steps or modifications may be used, if desirable. For example, the induction imaging system may be adopted to a specific continuous tone imaging process. In addition, other materials may be incorporated in or coated on the developer, photoconductor material and receiving members which will enhance, synergize, or otherwise desirably effect the properties of these materials for their present use. For example, the spectral sensitivity of the plates prepared and used in conjunction with the present system may be modified by incorporating photosensitizing dyes therein.

Anyone skilled in the art will have other modifications occur to him based on the teachings of the present invention. These modifications are intended to be encompassed within the scope of this invention.

"Contiguous," and variant forms thereof for the purposes of this invention, is defined as in Webster's New Collegiate Dictionary, second edition, 1960; "In actual contact; touching; also, near, though not in contact; adjoining."

What is claimed is:
1. An imaging method comprising the steps of:
   (1) providing a first surface having an electrostatic latent image thereon;
   (2) positioning a receiving member with a resistivity between about $10^7$ and $10^{14}$ ohm-cm. against said first surface;
   (3) applying a potential to said receiving member, at least in those portions desired to be imaged, said potential not to exceed the potential which would produce a field, between said first surface and the bottom surface of the receiving member, sufficient to produce field discharge; each of said positioning of step (2) and said applying a potential of step (3) occurring for a minimum time period equal to about the induction time $\tau_i$ of the particular receiving member being used, wherein $\tau_i = 8.85 \times 10^{-14} \rho_p \times t_p / t_a$ where $\rho$ is the volume resistivity (in ohm.-cm.) of the receiving member material, $t_p$ is the thickness of the receiving member material and $t_a$ is the spacing between the bottom surface of the receiving member and the first surface; and
   (4) stripping said receiving member from said first surface while maintaining contiguity, at least in the region where stripping is occurring, between the free surface of said receiving member and an electrically conductive member ungrounded or at a bias in the order of between ground and not to exceed the bias which would produce a field between said first surface and the bottom surface of the receiving member sufficient to produce field discharge; whereby an induced electrostatic latent image is formed in said receiving member.

2. An imaging method according to claim 1 wherein in step (3) said potential is applied by contacting the free surface of said receiving member at least in those portions desired to be imaged, with an electrically conductive member ungrounded, grounded or biased and wherein said method includes the step of developing said induced electrostatic latent image with electroscopic marking material.

3. An imaging method according to claim 2 wherein at least portions of said induced electrostatic latent image are developed within a period beginning with the stripping of corresponding portions of said receiving member and extending for a period equal to about the relaxation time of the receiving member material.

4. An imaging method according to claim 3 wherein at least portions of said induced electrostatic image are developed, simultaneously with or immediately after the stripping of corresponding portions of said receiving member, by applying electroscopic marking material to the free surface of said receiving member.

5. An imaging method according to claim 2 wherein at least one of said electrically conductive members is a roller.

6. An imaging method according to claim 3 wherein at least portions of said induced electrostatic image are developed, immediately after stripping of corresponding portions of said receiving member by applying electroscopic marking material to the bottom surface of the receiving member.

7. An imaging method according to claim 2 wherein the resistivity of said receiving member is between about $10^9$–$10^{12}$ ohm-cm.

8. An imaging method according to claim 2 wherein at least one electrically conductive member is biased at about the potential of and the same polarity as the lower charge portions of the electrostatic latent image on said first surface.

9. An imaging method according to claim 8 wherein the induced electrostatic latent image is developed with electroscopic marking material of the same polarity as the electrostatic latent image on said first surface.

10. An imaging method according to claim 2 wherein at least one electrically conductive member is biased at about the potential of and the same polarity as the higher charge portions of the electrostatic latent image on said first surface.

11. An imaging method according to claim 10 wherein the induced electrostatic latent image is developed with electroscopic marking material of opposite polarity to that of the electrostatic latent image on said first surface.

12. An imaging method according to claim 4 wherein said electroscopic marking material is applied from the electrically conductive member used in the stripping step.

13. An imaging method according to claim 12 wherein said electroscopic marking material is from a developer comprising a liquid.

14. An imaging method according to claim 13 wherein the electrically conductive member used to apply said electroscopic marking material is a roller.

15. An imaging method according to claim 1 wherein said receiving member is paper.

16. An imaging method according to claim 2 wherein said receiving member is paper and said electroscopic marking material is from a developer comprising a liquid.

17. An imaging method according to claim 12 wherein the electrically conductive member used to apply said electroscopic marking material is a magnetic brush developing member having magnetic carrier held in a magnetic field and powdered electroscopic marking material held triboelectrically to said magnetic carrier material.

18. An imaging method according to claim 4 wherein said electroscopic marking material is applied by contacting said receiving member with a magnetic brush developing member having magnetic carrier held in a magnetic field and powdered electroscopic marking material held triboelectrically to said magnetic carrier material.

19. An imaging method according to claim 6 wherein said electroscopic marking material is applied by contacting said receiving member with a magnetic brush developing member having magnetic carrier held in a magnetic field and powdered electroscopic marking material held triboelectrically to said magnetic carrier material.

20. An imaging method according to claim 6 wherein said electroscopic marking material is applied from a marking material loaded donor surface continuously presenting new donor surfaces loaded with toner to new portions of the bottom surface of the receiving member.

21. An imaging method according to claim 20 wherein said electroscopic marking material is from a developer comprising a liquid.

22. An imaging method according to claim 21 wherein said donor surface is a rotating cylindrical surface.

23. An imaging method according to claim 20 wherein said donor surface is a magnetic brush developing member having magnetic carrier held in a magnetic field and powered electroscopic marking material held triboelectrically to said magnetic carrier material.

24. An imaging method according to claim 12 wherein the electrically conductive member used to apply said electroscopic marking material is a sheet which is laid marking material side down on the receiving member in contact with those portions of the receiving member desired to be developed.

25. An imaging method according to claim 8 wherein at least one of said electrically conductive members is a roller, wherein said receiving member is paper at a relative humidity between about 75% and 5% relative humidity, wherein said paper is stripped at a rate of between about 2 to about 65 inches per second and wherein the time that the paper is positioned against said first surface is at least about 3 to about 30 times longer than the time between stripping and development.

26. An imaging method according to claim 10 wherein at least one of said electrically conductive members is a roller, wherein said receiving member is paper at a relative humidity between about 75% and 5% relative humidity, wherein said paper is stripped at a rate of between about 2 to about 65 inches per second and wherein the time that the paper is positioned against said first surface is at least about 3 to about 30 times longer than the time between stripping and development.

27. An imaging method according to claim 25 wherein steps (2)-(4) of claim 1 are repeated for at least one additional paper receiving member.

28. An imaging method according to claim 26 wherein steps (2)-(4) of claim 1 are repeated for at least one additional paper receiving member.

29. An imaging method according to claim 25 wherein the bias in the potential applying step is about the same in polarity and potential as the electrical condition of the electrically conductive member during stripping and the bulk resistivity of the paper receiving member is between about $2 \times 10^{10}$ to about $2 \times 10^{12}$ ohm-cm.

30. An imaging method according to claim 26 wherein the bias in the potential applying step is about the same in polarity and potential as the electrical condition of the electrically conductive member during stripping and the bulk resistivity of the paper receiving member is between about $2 \times 10^{10}$ to about $2 \times 10^{12}$ ohm-cm.

31. An imaging method according to claim 2 wherein said receiving member is a continuous web.

32. An imaging method according to claim 31 whereafter development said developed image is transferred to a copy receiving sheet.

References Cited

UNITED STATES PATENTS

| | | | |
|---|---|---|---|
| 2,786,440 | 3/1957 | Giaimo | 96—1X |
| 2,877,133 | 3/1959 | Mayer | 117—37LX |
| 2,982,647 | 5/1961 | Carlson et al. | 96—1 |
| 3,057,719 | 10/1962 | Byrne et al. | 96—1 |
| 3,084,061 | 4/1963 | Hall | 117—17.5 |
| 3,147,679 | 9/1964 | Schaffert | 96—1X |
| 3,271,145 | 9/1966 | Robinson | 96—1 |
| 3,281,857 | 10/1966 | Kaiser | 96—1X |
| 3,284,224 | 11/1966 | Lehmann | 96—1X |
| 3,322,538 | 5/1967 | Redington | 96—1.1 |
| 3,332,396 | 7/1967 | Gundlach | 118—637 |

GEORGE F. LESMES, Primary Examiner

C. E. VAN HORN, Assistant Examiner

U.S. Cl. X.R.

96—1.4; 117—17.5, 37; 118—637; 346—74; 355—3, 10, 16, 17

PO-1050
(5/69)

UNITED STATES PATENT OFFICE
CERTIFICATE OF CORRECTION

Patent No. 3,551,146          Dated December 29, 1970

Inventor(s) Robert W. Gundlach

It is certified that error appears in the above-identified patent and that said Letters Patent are hereby corrected as shown below:

Column 1, line 69, "retains" should read --retain--.
Column 5, line 2, "Ccm" should read --Vcm--; and line 63, "electrostataic" should read --electrostatic--.
Column 7, line 48, "sheets" should read --sheet--.
Column 8, lines 61-64, "In a time $$\tau rt \; \Delta V_t = \frac{\Delta Vo}{e}$$ "

should read --In a time $\tau r$, $$\Delta V_t = \frac{\Delta Vo}{e}$$ --.

Column 18, line 66, " $\mathbb{I}$ " should read --$\mathbb{XI}$--.
Claim 1, line 57, " $\rho$ " should read -- $\rho_p$ --.

Signed and sealed this 27th day of April 1971.

(SEAL)
Attest:

EDWARD M. FLETCHER, JR.        WILLIAM E. SCHUYLER, JR.
Attesting Officer               Commissioner of Patents